(12) United States Patent
Wang et al.

(10) Patent No.: US 9,542,024 B2
(45) Date of Patent: Jan. 10, 2017

(54) IN-CELL TOUCH DISPLAY PANEL, METHOD FOR MANUFACTURING THE SAME AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Lei Wang, Beijing (CN); Xue Dong, Beijing (CN); Shengji Yang, Beijing (CN); Hailin Xue, Beijing (CN); Haisheng Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 37 days.

(21) Appl. No.: 14/346,842

(22) PCT Filed: Nov. 28, 2013

(86) PCT No.: PCT/CN2013/087996
§ 371 (c)(1),
(2) Date: Mar. 24, 2014

(87) PCT Pub. No.: WO2014/194612
PCT Pub. Date: Dec. 11, 2014

(65) Prior Publication Data
US 2015/0220187 A1 Aug. 6, 2015

(30) Foreign Application Priority Data

Jun. 8, 2013 (CN) .......................... 2013 1 0228644

(51) Int. Cl.
*G06F 3/00* (2006.01)
*G06F 3/041* (2006.01)

(52) U.S. Cl.
CPC ........ *G06F 3/0412* (2013.01); *Y10T 29/49105* (2015.01)

(58) Field of Classification Search
None
See application file for complete search history.

(56) References Cited

U.S. PATENT DOCUMENTS

2010/0073325 A1\* 3/2010 Yang ........................ G06F 3/044
345/174
2011/0025639 A1\* 2/2011 Trend et al. .................. 345/174
(Continued)

FOREIGN PATENT DOCUMENTS

| CN | 102455831 A | \* | 5/2012 |
| CN | 102466907 A | | 5/2012 |

(Continued)

OTHER PUBLICATIONS

Written Opinion of the International Searching Authority dated Mar. 7, 2014; PCT/CN2013/087996.
(Continued)

*Primary Examiner* — Michael Faragalla
(74) *Attorney, Agent, or Firm* — Ladas & Parry LLP

(57) ABSTRACT

An in-cell touch display panel, a method for manufacturing the same, and a display device are disclosed. The in-cell touch display panel includes a first substrate and a second substrate disposed opposite to each other, a driving electrode layer disposed on the first substrate and comprises a plurality of driving electrodes, a sensing electrode layer disposed on the second substrate and comprises a plurality of sensing electrode groups, each of the sensing electrode groups comprises at least two sensing electrodes, the sensing elec- (Continued)

trodes in each of the sensing electrode groups are disposed intercross with the driving electrodes, wherein the adjacent sensing electrodes in each of the sensing electrode groups are connected with each other by sensing electrode connecting wires arranged with an interval, and a projection of the sensing electrode connecting wires on the first substrate is not overlapped with the driving electrodes.

8 Claims, 3 Drawing Sheets

(56) References Cited

U.S. PATENT DOCUMENTS

| | | | |
|---|---|---|---|
| 2011/0074729 A1* | 3/2011 | Im et al. | 345/174 |
| 2012/0105337 A1 | 5/2012 | Jun et al. | |
| 2014/0333847 A1* | 11/2014 | Yu | G06F 3/044 349/12 |
| 2015/0077389 A1 | 3/2015 | Ding et al. | |

FOREIGN PATENT DOCUMENTS

| | | |
|---|---|---|
| CN | 103049155 A | 4/2013 |
| CN | 103092424 A | 5/2013 |
| CN | 203350823 U | 12/2013 |

OTHER PUBLICATIONS

International Search Report mailed Mar. 20, 2014; PCT/CN2013/087996.

First Chinese Office Action dated Sep. 30, 2016; Appln. No. 201310228644.1.

\* cited by examiner

IN-CELL TOUCH DISPLAY PANEL, METHOD FOR MANUFACTURING THE SAME AND DISPLAY DEVICE

TECHNICAL FIELD

Embodiments of the invention relate to a field of liquid crystal display panel, in particular to an in-cell touch display panel, a method for manufacturing the same, and a display device.

BACKGROUND

With a rapid development of touch screen, current mainstream products mostly adopt a touch screen in which a touch panel is directly added to a surface layer of display panel (Add On structure). However, such a conventional Add On touch screen is heavy and thick, and has higher cost. With the consumer's demand for a lighter and thinner touch screen, in-cell touch screens become important development direction in the touch screen field.

In a conventional in-cell touch screen, both of driving electrode and sensing electrode are designed within the liquid crystal panel. The driving electrodes adopt shared common electrodes, thus each of the common electrodes acts as one driving electrode. Sensing electrodes are formed on inner side of an opposing substrate and at positions opposite to black matrix. Although the sensing electrodes designed as described above have sensing function, load and node capacitance of the sensing electrodes could not be in an appropriate range for fulfilling the integrated circuit standard due to limitations in manufacturing process, thus the performance of the touch screen is deteriorated.

SUMMARY

Accordingly, a main object of the invention is to provide an in-cell touch display panel and a method for manufacturing the same, which can avoid an overlapping area formed between driving electrodes in a driving electrode layer and sensing electrodes in a sensing electrode layer, and avoid a significant increase of a capacitance between the driving electrodes in the driving electrode layer and the sensing electrodes in the sensing electrode layer, thus performance of a touch screen can be improved.

To achieve the above mentioned object, embodiments of the invention provide the following technical solutions:

According to a first aspect of the invention, there is provided an in-cell touch display panel comprising: a first substrate and a second substrate disposed opposite to each other, a driving electrode layer disposed on the first substrate and comprises a plurality of driving electrodes, a sensing electrode layer disposed on the second substrate and comprises a plurality of sensing electrode groups, each of the sensing electrode groups comprises at least two sensing electrodes, the sensing electrodes in each of the sensing electrode groups are disposed intercross with the driving electrodes, wherein the adjacent sensing electrodes in each of the sensing electrode groups are connected with each other by sensing electrode connecting wires arranged with an interval, and a projection of the sensing electrode connecting wires on the first substrate is non-overlapped with the driving electrodes.

As an example, an extending direction of the sensing electrode connecting wires is parallel to that of the driving electrodes.

As an example, a metal electrode layer is further disposed on the first substrate and comprises at least two metal electrodes, an insulating layer is disposed between the metal electrode layer and the driving electrode layer.

As an example, the metal electrode is connected with the driving electrode by a via hole at position where the metal electrode is non-overlapped with the sensing electrode connecting wires, and a projection of the via hole on the first substrate is within a region where the driving electrode locates.

As an example, the metal electrode is connected with a common electrode by a peripheral connecting wire at position where the metal electrode is overlapped with the sensing electrode connecting wires.

According to a second aspect of the invention, there is provided a display device comprising the in-cell touch display panel described above.

According to a third aspect of the invention, there is provided a method for manufacturing an in-cell touch display panel, comprising: forming a metal electrode layer, a first insulating layer, a driving electrode layer and a second insulating layer on a first substrate in sequence through a patterning process, the driving electrode layer comprises at least a plurality of driving electrodes, the metal electrode layer comprises at least two metal electrodes; and forming a sensing electrode layer on a second substrate through a patterning process, the sensing electrode layer comprises a plurality of sensing electrode groups, each of which comprises at least two sensing electrodes, the adjacent sensing electrodes in each of the sensing electrode groups are connected with each other by the sensing electrode connecting wires arranged with an interval, an extending direction of the sensing electrode connecting wires is parallel to that of the driving electrodes, and a projection of the sensing electrode connecting wires on the first substrate is non-overlapped with the driving electrodes.

As an example, the metal electrode is connected with the driving electrode by a via hole at position where the metal electrode is non-overlapped with the sensing electrode connecting wires, and a projection of the via hole on the first substrate is within a region where the driving electrode locates.

As an example, the metal electrode is connected with a common electrode by a peripheral connecting wire at position where the metal electrode is overlapped with the sensing electrode connecting wires.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

LIST OF REFERENCE NUMERALS

1—first substrate; 10—metal electrode layer; 100—first metal electrode; 101—second metal electrode; 11—first insulating layer; 12—driving electrode layer; 120—driving electrode; 122—via hole; 13—second insulating layer; 2—second substrate; 20—sensing electrode layer; 200—sensing electrode; 201—sensing electrode connecting wire; 3—liquid crystal layer.

DETAILED DESCRIPTION

In order to make objects, technical details and advantages of the embodiments of the invention more apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationships, and when the position of the object which is described is changed, the relative position relationship may be changed accordingly.

Embodiment 1

Figure 1:
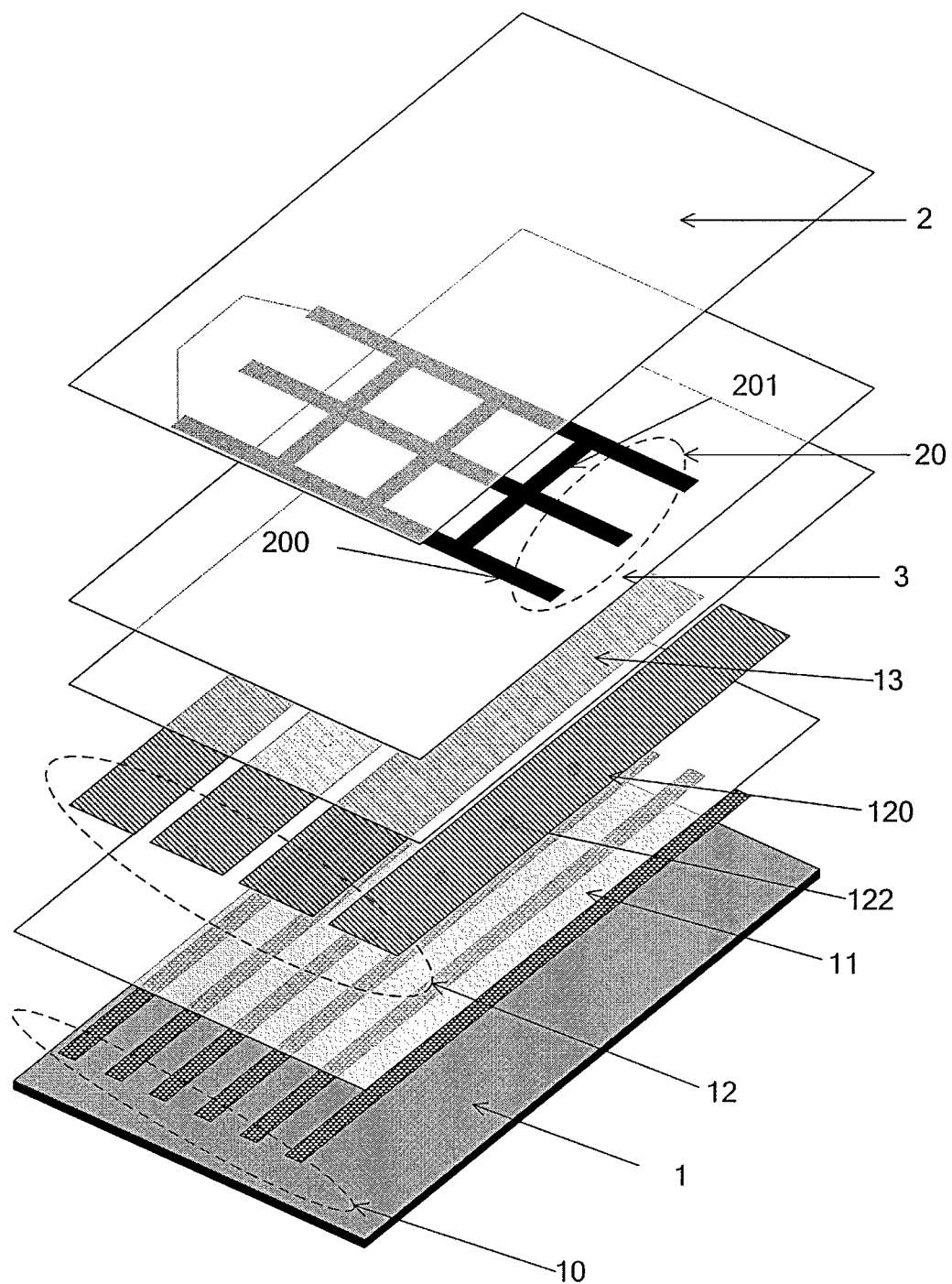
FIG. 1 is a schematic perspective view of each layer of an in-cell touch display panel in an embodiment of the invention.
Figure 2:
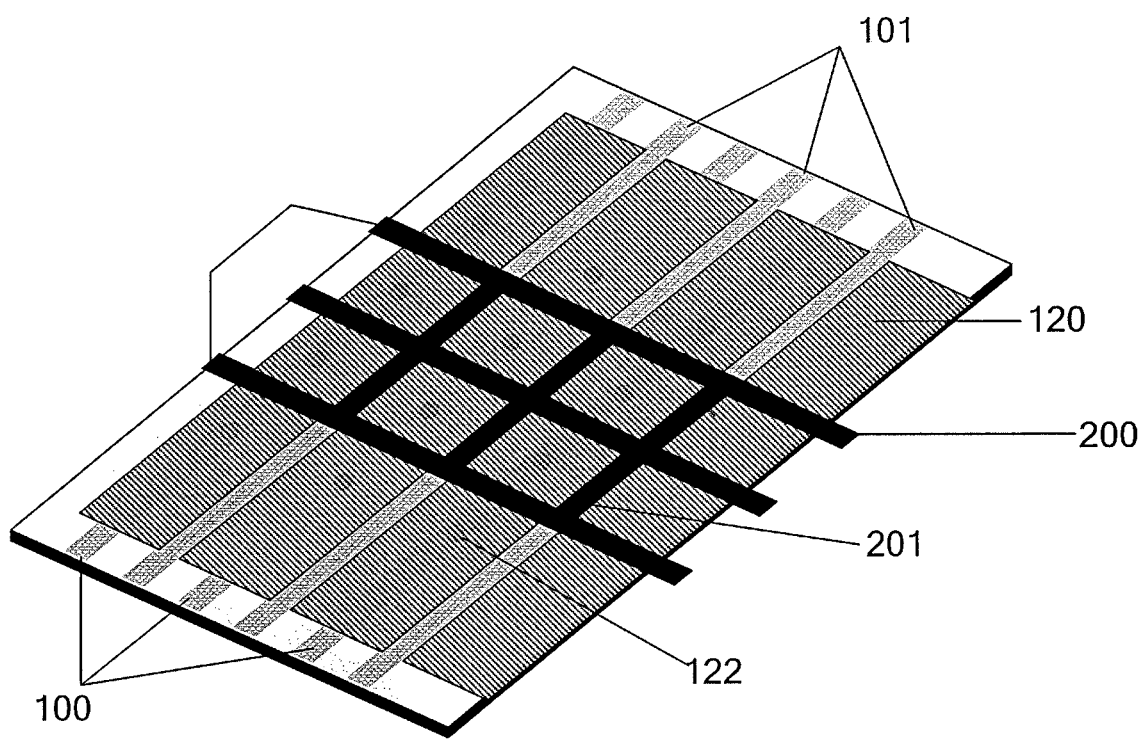
FIG. 2 is a top view of an in-cell touch display panel in an embodiment of the invention.

FIG. 1 is a schematic perspective view of each layer of an in-cell touch display panel provided in an embodiment of the invention. FIG. 2 is a top view of an in-cell touch display panel provided in an embodiment of the invention. The in-cell touch display panel as illustrated comprises a first substrate 1 and a second substrate 2 disposed opposite to each other, a driving electrode layer 12 disposed on the first substrate 1 and comprises a plurality of driving electrodes 120, a sensing electrode layer 20 disposed on the second substrate 2 and comprises a plurality of sensing electrode groups. Each of the sensing electrode groups comprises at least two sensing electrodes 200, the driving electrodes 120 are disposed intercross with the sensing electrodes 200, for example, the driving electrodes 120 are disposed laterally, and the sensing electrodes 200 are disposed longitudinally. The adjacent sensing electrodes 200 are connected with each other by sensing electrode connecting wires 201 which are arranged with an interval, and a projection of the sensing electrode connecting wires 201 on the first substrate 1 is not overlapped with the driving electrodes 120.

In an example, the sensing electrode connecting wires 201 is extended in a direction parallel to that of the driving electrodes 120, i.e. the sensing electrode connecting wires 201 is extended in a direction perpendicular to that of the sensing electrodes 200. However, the extending direction of the sensing electrode connecting wires 201 may not be parallel to that of the driving electrodes 120, as long as the projection of the sensing electrode connecting wires 201 on the first substrate 1 is not overlapped with the driving electrodes 120.

It should be noted that the sensing electrode connecting wires 201 arranged with an interval means that the adjacent sensing electrodes may be connected with each other by a plurality of sensing electrode connecting wires 201 being parallel to each other, the adjacent sensing electrodes 200 of each sensing electrode group connected by the sensing electrode connecting wires 201 can reduce the resistance of the sensing electrode group. The number of the sensing electrode connecting wires may be set as desired, which will not be limited herein.

Since the extending direction of the sensing electrode connecting wires is parallel to that of the driving electrodes and the projection of the sensing electrode connecting wires on the first substrate is not overlapped with the driving electrodes, an overlapping area between new added sensing electrode connecting wires and the driving electrodes may be minimized, thereby decreasing mutual capacitance between the sensing electrode and the driving electrode.

Herein, FIG. 1 only illustrates an in-cell touch display panel with a sensing electrode layer having three sensing electrodes. This configuration is only deemed as an exemplary implementation, and not intended to limit the configuration of the invention. In practice, the number of the sensing electrodes in each layer and the interval between the sensing electrodes may be set depending on specific application. It is notable that the three connected sensing electrodes in the sensing electrode layer may be referred to as one sensing electrode group, in which each sensing electrode transmits identical sensing signal. The sensing electrode layer may comprise several identical sensing electrode groups, and the sensing electrode groups may be not connected with each other. The number of the sensing electrode groups may be determined depending on specific conditions, such as size of the touch screen, resolution of the touch screen, or the like.

Embodiment 2

As illustrated in FIGS. 1 and 2, an in-cell touch display panel provided in the embodiment comprises a first substrate 1 and the following layers sequentially formed on the first substrate 1: a metal electrode layer 10, a first insulating layer 11, a driving electrode layer 12 and a second insulating layer 13.

The in-cell touch display panel further comprises a second substrate 2 on which a plurality of sensing electrode groups are disposed, each of the sensing electrode groups comprises a plurality of sensing electrodes 200. The adjacent sensing electrodes 200 in each sensing electrode group are connected with each other by sensing electrode connecting wires 201 which are arranged with an interval.

After the first substrate 1 and the second substrate 2 are assembled to form a cell, a liquid crystal layer 3 is filled, then, the touch display panel as illustrated in FIG. 1 is obtained.

In the touch display panel, the metal electrode layer 10 comprises at least two metal electrodes, the orientation of each metal electrode is parallel to the direction of the driving electrode, and the projections of both the metal electrode and the driving electrode on the first substrate 1 may be overlapped, or not overlapped with each other.

Figure 3A:
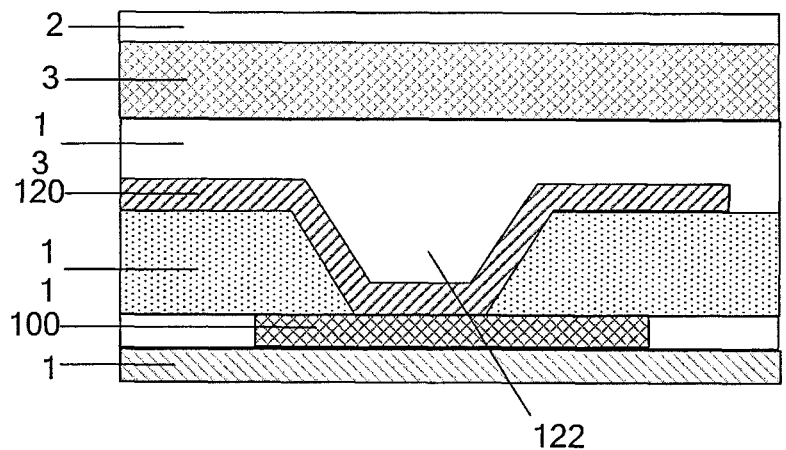
FIG. 3a is a schematic view of corresponding positions of the first metal electrodes in FIG. 2.

At position where the metal electrode is not overlapped with the sensing electrode connecting wires, a first metal electrode 100 is connected with the driving electrode 120 by means of a via hole 122, the projection of the via hole 122 on the first substrate 1 is within a region where the driving electrodes 120 locates, as illustrated in FIG. 3a.

Figure 3B:
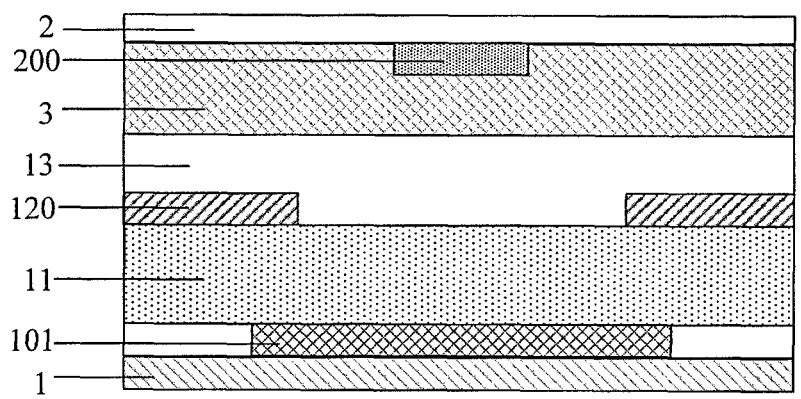
FIG. 3b is a schematic view of corresponding positions of the second metal electrodes in FIG. 2.

Further, at position where the metal electrode is overlapped with the sensing electrode connecting wires, a second metal electrodes 101 is connected with a common electrode by means of a peripheral connecting wire, and the second metal electrode 101 is not connected with the driving electrode by means of a via hole, as illustrated in FIG. 3b.

Because the first metal electrode 100 is connected with the driving electrode 120 by means of the via hole, at the time of the display panel being touched, the first metal electrode 100 transmits driving signal and presents a driving sensitivity. Whether the touch display panel operates in touch or display stage, the second metal electrode 101 is connected with the common electrode all the time and only used as part of the common electrode.

When the in-cell touch display panel in the embodiment of the invention operates in touch stage, both the first metal electrode 100 of the metal electrode layer which is connected with the driving electrode of the driving electrode layer and the driving electrode of the driving electrode layer act as the driving electrodes, while the second metal electrode 101 of the metal electrode layer only act as the metal electrode which is connected with the common electrode. When the in-cell touch display panel operates in display stage, the second metal electrode 101 of the metal electrode layer which are not connected with the driving electrode of the driving electrode layer act as the metal electrode, while both the first metal electrode 100 and the driving electrodes of the driving electrode layer act as the driving electrodes. In this way, the overlapping area could not be formed between the driving electrode of the driving electrode layer and the sensing electrode of the sensing electrode layer, and the capacitance between the driving electrode of the driving electrode layer and the sensing electrode of the sensing electrode layer could not be significantly increased, thus the performance of the touch screen can be improved. Moreover, since the second metal electrode 101 of the metal electrode layer act as the metal electrode regardless of the touch display panel operates in touch or display stage, the capacitance between the driving electrode of the driving electrode layer and the sensing electrode of the sensing electrode layer can be further decreased, thus the performance of the touch screen can be further improved.

With the in-cell touch display panel in the embodiments of the invention, the adjacent sensing electrodes in the sensing electrode layer are connected with each other, such that the adjacent sensing electrodes are connected with each other, and thus the resistance of the sensing electrode group can be decreased.

In summary, the in-cell touch display panel provided by the embodiments of the invention not only decreases the load of the sensing electrodes, but also suppresses additional node capacitance. Moreover, the in-cell touch display panel provided by the embodiments of the invention can find out the most optimized configuration solution by a software simulation, and control the load within an optimal range, which can improve the performance of the touch screen.

Further, since the in-cell touch display panel provided by the embodiments of the invention is mainly directed to the in-cell touch display panel, in which the driving electrodes adopt shared common electrodes, thus each of the common electrodes acts as one driving electrode, and thus the first substrate 1 may be an array substrate, the second substrate 2 may be an opposing substrate.

Embodiment 3

The embodiment of the invention further provides a display device comprising any one of the in-cell touch display panel as described above. The display panel in the embodiments of the invention may be applied to, but not limited to, an Advanced Super Dimension Switching (ADS) mode touch display panel. In the ADS mode touch display panel provided by the embodiment of the invention, driving electrodes adopt transparent common electrodes which are made of Indium Tin Oxides (ITO) material and disposed on the array substrate. Since the ITO have a relatively higher electrical resistivity, it is connected to a metal with lower electrical resistivity through a via hole, so as to reduce the resistance of the common electrodes.

Embodiment 4

The embodiment of the invention further provides a method for manufacturing an in-cell touch display panel, comprising:

forming a metal electrode layer, a first insulating layer, a driving electrode layer and a second insulating layer on a first substrate in sequence through a patterning process, the driving electrode layer comprises at least a plurality of driving electrodes, the metal electrode layer comprises at least two metal electrodes;

forming a sensing electrode layer on a second substrate through a patterning process, the sensing electrode layer comprises a plurality of sensing electrode groups, each of which comprises at least two sensing electrodes, the adjacent sensing electrodes in each of the sensing electrode groups are connected with each other by sensing electrode connecting wires which are arranged with an interval, an extending direction of the sensing electrode connecting wires is parallel to that of the driving electrodes, and a projection of the sensing electrode connecting wires on the first substrate is non-overlapped with the driving electrodes.

Further, the metal electrode may be connected with the driving electrode by a via hole at position where the metal electrode is non-overlapped with the sensing electrode connecting wires, and a projection of the via hole on the first substrate is within a region where the driving electrode locates.

Further, the metal electrode may be connected with a common electrode by a peripheral connecting wire at position where the metal electrode is overlapped with the sensing electrode connecting wires.

Further, the metal electrodes may be made of the same material as a gate line or data line in the array substrate.

What are described above is related to the illustrative embodiments of the disclosure only and not limitative to the scope of the disclosure; the scopes of the disclosure are defined by the accompanying claims.

What is claimed is:

1. An in-cell touch display panel, comprising: a first substrate and a second substrate disposed opposite to each other, a driving electrode layer disposed on the first substrate and comprising a plurality of driving electrodes, a sensing electrode layer disposed on the second substrate and comprising a plurality of sensing electrode groups, each of the sensing electrode groups comprising at least two sensing electrodes, the sensing electrodes in each of the sensing electrode groups being disposed to intercross with the driving electrodes, wherein the adjacent sensing electrodes in each of the sensing electrode groups are connected with each other by sensing electrode connecting wires arranged with an interval, and an orthogonal projection of the sensing electrode connecting wires on the first substrate is non-overlapped with the driving electrodes;

wherein the sensing electrode connecting wires that connect the adjacent sensing electrodes together in respective sensing electrode groups have an extending direction parallel to that of the driving electrodes; and wherein a metal electrode layer is disposed on the first substrate and comprises at least a first metal electrode and at least a second metal electrode, and the first metal electrode and the second metal electrode also have an extending direction parallel to that of the driving electrodes.

2. The in-cell touch display panel according to claim 1, wherein an insulating layer is disposed between the metal electrode layer and the driving electrode layer.

3. The in-cell touch display panel according to claim 2, wherein the first metal electrode is connected with one of the driving electrodes at least by a via hole, the first metal electrode is non-overlapped with the orthogonal projection of the sensing electrode connecting wires on the first substrate, and an orthogonal projection of the via hole on the first substrate is within a region where the one of the driving electrodes is located.

4. The in-cell touch display panel according to claim 2, wherein the second metal electrode is connected with a common electrode by a peripheral connecting wire, and the second metal electrode is overlapped with the orthogonal projection of the sensing electrode connecting wires on the first substrate.

5. A display device comprising the in-cell touch display panel according to claim 1.

6. A method for manufacturing an in-cell touch display panel, comprising:

forming a metal electrode layer, a first insulating layer, a driving electrode layer and a second insulating layer on a first substrate in sequence through a patterning process, wherein the driving electrode layer comprises at least a plurality of driving electrodes, and the metal electrode layer comprises at least a first metal electrode and at least a second metal electrode; and forming a sensing electrode layer on a second substrate through a patterning process, wherein the sensing electrode layer comprises a plurality of sensing electrode groups, each of the sensing electrode groups comprises at least two sensing electrodes, the adjacent sensing electrodes in each of the sensing electrode groups are connected with each other by the sensing electrode connecting wires arranged with an interval, an extending direction of the sensing electrode connecting wires that connect the adjacent sensing electrodes together is parallel to that of the driving electrodes, and an orthogonal projection of the sensing electrode connecting wires on the first substrate is non-overlapped with the driving electrodes;

wherein the first metal electrode and the second metal electrode also have an extending direction parallel to that of the driving electrodes.

7. The method according to claim 6, wherein the first metal electrode is connected with one of the driving electrodes by a via hole, the first metal electrode is non-overlapped with the orthogonal projection of the sensing electrode connecting wires on the first substrate, and an orthogonal projection of the via hole on the first substrate is within a region where the one of the driving electrodes is located.

8. The method according to claim 6, wherein the second metal electrode is connected with a common electrode by a peripheral connecting wire, and the second metal electrode is overlapped with the orthogonal, projection of the sensing electrode connecting wires on the first substrate.

* * * * *